(12) United States Patent
Nowak

(10) Patent No.: US 10,975,607 B2
(45) Date of Patent: Apr. 13, 2021

(54) INTEGRATED SYSTEM RELEASING IN EMERGENCY PERSONS TRAPPED IN A VEHICLE, A METHOD IMPLEMENTING THIS SYSTEM, AND A METHOD OF MOUNTING AN ACTUATOR OPENING THE VEHICLE DOOR

(71) Applicant: NOWAK INNOVATIONS Sp. Z o.o., Krosno (PL)

(72) Inventor: Zygmunt Nowak, Krosno (PL)

(73) Assignee: NOWAK INNOVATIONS, SPOLKA Z OGRANICZONA ODPOWEDZIALNOSCIA, Krosno (PL)

( * ) Notice: Subject to any disclaimer, the term of this patent is extended or adjusted under 35 U.S.C. 154(b) by 0 days.

(21) Appl. No.: 16/092,404

(22) PCT Filed: Apr. 12, 2017

(86) PCT No.: PCT/PL2017/000041
§ 371 (c)(1),
(2) Date: Oct. 9, 2018

(87) PCT Pub. No.: WO2017/180000
PCT Pub. Date: Oct. 19, 2017

(65) Prior Publication Data
US 2019/0128045 A1    May 2, 2019

(30) Foreign Application Priority Data

Apr. 15, 2016    (PL) .......................... 416870

(51) Int. Cl.
*E05F 15/72*    (2015.01)
*E05B 77/12*    (2014.01)
(Continued)

(52) U.S. Cl.
CPC .............. *E05F 15/72* (2015.01); *B60R 21/02* (2013.01); *E05B 51/02* (2013.01); *E05B 77/12* (2013.01);
(Continued)

(58) Field of Classification Search
CPC .... E05F 15/72; B60R 21/02; B60R 2022/328; B60R 22/48; B60R 21/013; E05B 51/02;
(Continued)

(56) References Cited

U.S. PATENT DOCUMENTS

| 6,412,584 B1 | 7/2002 | Faigle |
| 2001/0022456 A1 | 9/2001 | Kitagawa |

(Continued)

FOREIGN PATENT DOCUMENTS

WO    WO 2005/037615    4/2005

*Primary Examiner* — Brian P Sweeney
(74) *Attorney, Agent, or Firm* — Horst M. Kasper, Esq

(57) ABSTRACT

An integrated system (PARIS) for releasing the persons trapped in a vehicle comprises a central processing unit (CPU), the input of which is connected to sensors (D1, D2, ... Dn), and the output of which is connected to at least three executive systems activated in a sequence: a system of automatic opening of the locks and the door bolts and blocking them in open position (LOB), a system of automatic deflecting the doors and locking them in open position (DOB), and a system of automatic cutting of the seat belts (SBC). A method for releasing the persons trapped in the vehicle performed by the system PARIS consists in that when it receives from the sensors (D1, D2, ... Dn) signals indicating an emergency and when the vehicle stops, the CPU sends to a system of automatic opening of the locks and the door bolts and blocking them in open position (LOB) a signal, then sends to a system of automatic deflecting the
(Continued)

Figure 1:
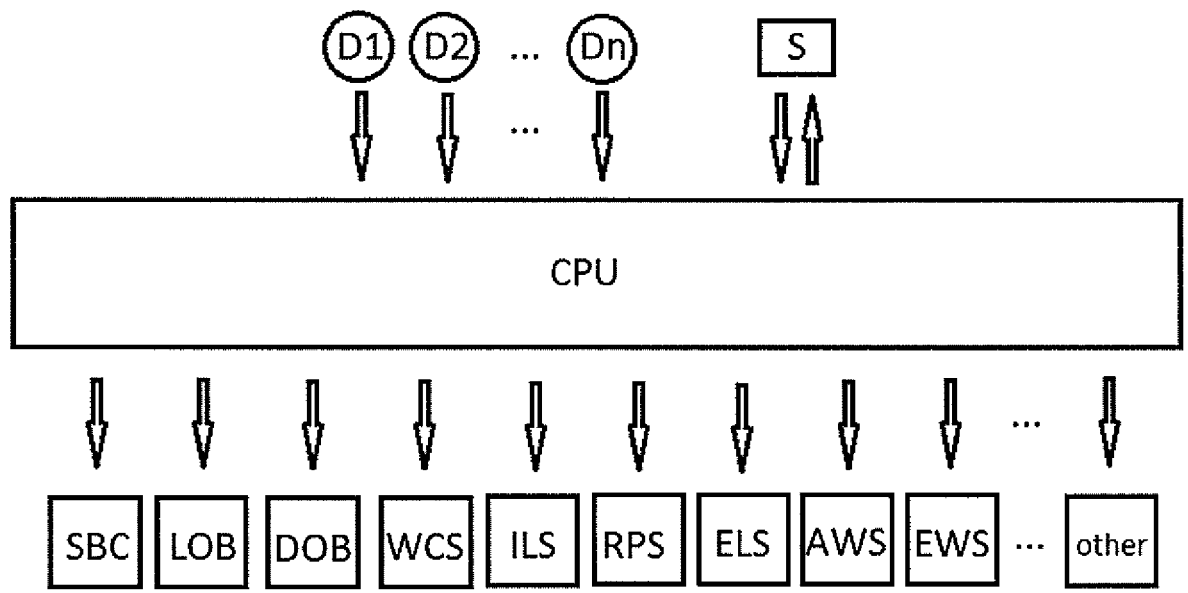

doors and locking them in open position (DOB) a signal, and then sends to a system of automatic cutting of the seat belts (SBC) a signal.

12 Claims, 5 Drawing Sheets

(51) Int. Cl.
    *E05B 51/02*     (2006.01)
    *B60R 21/02*     (2006.01)
    *B60R 22/32*     (2006.01)
    *B60Q 3/70*     (2017.01)
    *B60Q 1/52*     (2006.01)
    *B60R 21/013*     (2006.01)
    *B60R 22/48*     (2006.01)

(52) U.S. Cl.
    CPC ............... *B60Q 1/52* (2013.01); *B60Q 3/70* (2017.02); *B60R 21/013* (2013.01); *B60R 22/48* (2013.01); *B60R 2022/328* (2013.01); *E05B 51/023* (2013.01); *E05Y 2900/531* (2013.01)

(58) Field of Classification Search
    CPC . E05B 77/12; E05B 51/023; E05Y 2900/531; B60Q 1/52; B60Q 3/70
    USPC .......................................................... 701/45
    See application file for complete search history.

(56) References Cited

U.S. PATENT DOCUMENTS

2005/0240331 A1    10/2005   Nowak
2007/0265753 A1    11/2007   Cantu
2008/0120911 A1*   5/2008   Browne ................. E05F 1/105
                                                           49/352

* cited by examiner

INTEGRATED SYSTEM RELEASING IN EMERGENCY PERSONS TRAPPED IN A VEHICLE, A METHOD IMPLEMENTING THIS SYSTEM, AND A METHOD OF MOUNTING AN ACTUATOR OPENING THE VEHICLE DOOR

The present invention relates to a method of emergency releasing the persons trapped in a vehicle, in particular in case of a road accident, and to an integrated system for implementing this method. The present invention provides also a method for mounting the actuator used to open the vehicle door in emergency. The actuator is required to perform the method of releasing the persons closed inside the vehicle, and is included in the integrated rescue system.

The invention relates in particular to motor vehicles, especially cars due to their predominant share of traffic incidents, but it is also intended for buses and trucks. The invention can also be used in air- and watercrafts, especially these of lightweight construction as cabin yachts and small passenger aircrafts. The above examples of fields of use of the invention do not exclude the possibility of its use in special, e.g. military vehicles.

There have been many attempts to solve the problem of releasing the persons from the vehicles in case of emergency. In civil transport the key factor is quick releasing of the seat belt. If a person in the vehicle is able to move on his/her own, and is no longer restrained by the seat belts, may try to get out of the vehicle even when the doors are locked, e.g. through the window opening. Of course, getting out of the vehicle by a person seriously injured, infirm or unconscious, or a small child, even after releasing the seat belt, is usually impossible. In this case, only the quick help from other individuals can save the life of sufferer.

In the case of a road accident, the driver and passengers may have problems with releasing of the safety belts and leaving the wrecked vehicle. The snap fastener of the seat belt can jam or may not be within the reach of the accident victim. Injury after the accident and/or traumatic shock, especially for children, the elderly or disabled, may prevent them from releasing off the belts. Quick leaving the vehicle is very important because of risk of fire or risk of impact by another vehicle. Also being trapped in a vehicle sinking in water is an extremely hazardous circumstance that requires immediate escaping from the vehicle. Rescuing the injured passengers and the driver is often hampered by the fastened seat belts. The same problem may occur when a small airplane or glider, or a cabin boat has an accident.

Polish patent application PL415960 A1 extensively discusses a number of examples of prior art related to automatic cutting of safety belts in vehicles. According to the invention proposed therein, a device to cut the safety belt comprises a blade with a cutting edge, movable along the blade slot in a longitudinal housing. In emergency this blade cuts the waist belt disposed in a belt slot also formed in that longitudinal housing. The blade is accelerated by a gas-powered telescopic actuator, disposed within the internal chamber of the longitudinal housing. Telescopic actuator includes a head having at least one gas generator and the coaxial: outer sleeve, inner sleeve, and, optionally, at least one central sleeve which is movable between the outer and inner one. Central sleeve reduces both weight and length of the belt cutting device. The head has an aperture for the wiring connecting the at least one pressure generator, for example a pyrotechnic charge, to external controller. The latter analyzes the input data from various sensors and optionally generates ignition signal, activating the gas generator.

Leaving the vehicle after the accident on one's own, however, can be difficult even for a person who did not suffered damage and despite releasing of seat belts. The reason can be a shock, insufficient force needed to open the door, lack of tool to break the windowpane, limited or poor mobility, lack of knowledge on how to proceed in case of an accident, and even problems with spatial orientation in an unusual environment of wrecked car, or inside a car which is set in a large inclination or upside down.

Also, the security systems installed in the aircrafts, the civilian ones included, insufficiently provide the ability to open the door in emergency. In many airline disasters the pilots and passengers died only because the locked door prevented them from escaping quickly from the burning wreckage.

An attempt to cope with the problem of emergency opening the vehicle doors, especially the doors locked due to a car accident, is shown in Polish patent PL194447 B1 against extensively discussed prior art. According to this invention, the executive element of the emergency system opening the door lock is a pneumatic actuator powered by a pressure from at least two pyrotechnic charges. The signal of firing the first of the pyrotechnic charges is supplied to the electronic firing system by a set of three sensors, operating in succession: impact sensor, acceleration sensor and tilt sensor. Firing, if necessary, of the second pyrotechnic charge and possible subsequent pyrotechnic charges is controlled by a sensor of pressure inside the pneumatic actuator. The interval between successive firings of charges is regulated by an ignition circuit. Return of the piston rod of the pneumatic actuator to its starting position is performed by the solenoid valve that receives a signal alternatively from additionally installed in the vehicle: a pressure sensor or a distance sensor, a temperature sensor or a time sensor, depending on the sequence of events resulting in the sending of appropriate signals.

The pneumatic actuator in the described solution according to the patent PL194447 B1 is a compact telescope actuator with several coaxial sleeves, as in the aforesaid application PL415960 A1. Electrical system controls the power supply from the primary DC battery and emergency power supply from compact spare DC battery recharged by the main battery. Impact sensor, acceleration sensor and tilt sensor constitute one electric sensor circuit or these are individual sensors used in other vehicle safety systems, for example, in the airbag or the belt tensioner. At the side of the door the pneumatic actuator has a self-adjusting member adapted to the shape of the surface of the door element, suitable to release the mechanical blocking of the door lock or to trigger opening of the door lock. The self-adjusting element causing opening of the door is shaped so that acting on a relatively large surface area, that is not a point area, it could unlock a mechanical blocking of the lock either directly or through a lever and/or tension members system attached to the door, or activate the mechanism opening the lock. The pneumatic actuators are positioned inside the reinforced parts of the vehicle body, e.g. in the door pillars, sills or doors of the vehicle.

The system proposed in the patent PL194447 B1 is primarily designed to open the doors in passenger cars by opening the locks, in order to facilitate the passenger to push the already unlocked door. The system may also open the door by itself. However, this solution does not fully open the way out of the vehicle to the passenger, because in the case of strong blocking of the door in a bent car body using a single actuator to simultaneous opening the lock and pushing the door out may not be sufficient. On the other hand, usage of too much powerful actuator may increase the risk of injury to occupants of inside of the vehicle.

Attention should also be paid for vehicles with sliding doors that require much greater force to open than hinged door. Even a slight deformation of the rails caused by traffic incident can prevent opening despite of unlocking the lock, even by a person healthy and strong. Opening of sliding doors blocked in the rails generally requires to tear them out or cut with use of specialized tools. This means a big loss of time needed by a technical rescue team to reach the passengers.

It should also be noted that due to very short duration of action which consists of displacement of the sleeve of the pyrotechnic actuator, lasting only a few milliseconds, and its pulse impact on the opening mechanism of the door lock by means of the tension members, this solution has proved in practice only partly. The reason is a mechanical clearance in the opening mechanism of the door lock and in the lock itself. The opening mechanism of the door lock cannot keep up in such a short time of opening the lock and as a consequence the expanding actuator pushes the door unsuccessfully if the door lock has not been fully opened yet.

All the above described and still unresolved problems have led the inventors to develop a new method and system for emergency releasing the people out of the vehicle, and a method for assembling the actuators used to deflect the already unlocked door. Also a new system of actuators opening the locks and the door bolts, and the couplings between them is proposed.

Furthermore, the existence of separate, non-synchronized emergency systems of cutting seat belts and emergency opening of the door locks and the door itself creates the risk of premature, spontaneous opening the door immediately after unlocking the lock, when a person in the vehicle is not yet ready to leave it, or if the external conditions are not conducive to leaving the vehicle or even constitute a contraindication to evacuate. It may be the opposite situation, when cutting the seat belt occurs prematurely in relation to opening of the door locks. The inventors have come to the conclusion that the development of an integrated system that takes the decisions on how to act in actual, specific conditions, increase the chances of rescue for victims of accidents.

The essence of the proposed invention consists in that the system of integrated emergency release of persons trapped in the vehicle performs in a coordinated manner three separate elements: releasing the locks and the door bolts, pushing the door, even if it were to be associated with the destruction, and cutting the seat belts.

In the proposed invention, the system of emergency cutting safety belt is integrated with the system of emergency opening the door locks and the system of emergency deflecting the vehicle door, which together with the other systems listed below form an integrated system for the emergency release of persons trapped in the vehicle. The integration is based on the fact that all the functions and operations of the integrated system are coordinated with one another and remain under full control of that system. Opening the door should be further understood as opening to the extent dependent of their condition after the accident, but allowing the accident victim to leave the vehicle, or opening that requires destruction of certain elements, such as hinges, rails, locks, windows etc., or even destruction of the entire door. The invention also applies to the luggage compartment cover or doors, which for trapped people may be an additional escape route or a way of getting the rescuers to the interior of the vehicle.

The system autonomously and without interfering with the user takes definite decisions separately in relation to each person in the vehicle. For example, when the vehicle chassis is set upside down and the passenger is a small child fastened in a child seat, the system does not decide to cut the safety belts securing the seat. If the belts are cut without assistance of an adult the child would be exposed to severe trauma while falling down to the ceiling of the car, while the child itself would not be able to leave the vehicle. Only the signal from the rescuing person activates the belt auto cutting. Nevertheless, in order to enable reaching a child as soon as possible the systems unlocking the lock and deflecting the doors are activated on the trot immediately after the vehicle stops.

Individualization of decisions made by the integrated system regarding individually each person in the vehicle requires supplying it with suitable, additional sensor system, for example, sensors of pressure exerted on the seat and/or the seat back, seat belt sensors, etc. In the absence or disability of such a system of additional sensors, the integrated system will perform emergency standard procedures in a sequence: opening of the locks and the door bolts, pushing the door and cutting the seat belts.

The integrated system comprises a central processing unit, which is connected to a set of sensors, in particular crash and acceleration sensors, sensors of airbags activation, sensors of belts fastening and tension, sensors of speed, displacement, tilt, temperature, air pressure, including tire pressure, cameras, water detectors, satellite positioning receivers, and others.

The buttons and/or manual switches placed inside the vehicle are also connected to the inputs of the central processing unit. They allow for activation of specific functions of the integrated system, e.g. the function of cutting the seat belt securing the safety seat for a small child, as in the above discussed example of the vehicle overturned on the roof. These buttons and switches may be mounted on the elements of additional equipment, such as a child seat, according to the standard required by the integrated system.

The input/output socket is also connected to the central processing unit by wire for connecting the service computer.

All input signals are delivered to the central processing unit by wire, in order to protect the system against receiving accidental radio signals which do not come from the sensor system, or hacking signals emitted with the aim to break into the system and take control over it by an unauthorized person. However, this is not a limitation of the invention, since all the input and output signals can be transmitted in the integrated system proposed by wireless means and/or by wire.

Outputs of the central processing unit are connected to the operating devices, which are in particular: the system for auto-opening the locks and door bolts, the system for auto deflecting the doors, the system for auto-cutting the seat belts, the system for wireless communication, the system for emergency lighting inside the vehicle, the system for radio positioning, and others.

The central processing unit processes the data received from the sensors and on the basis of an algorithm stored in a permanent memory generates the control signals transmitted to the operating devices, e.g. the signals initiating the mechanisms for automatic cutting the seat belts, the signals initiating the mechanisms for automatic opening the door locks or the signals initiating the mechanisms for automatic deflecting the doors. Also the signals notifying of the incident can be generated, which, together with the data defining the current status of the vehicle, including its coordinates, possibly after encryption are sent to the system of wireless communication for radio transmission to the dispatcher and/or appropriate services.

The processing unit and other electronic components are powered by a DC voltage source, preferably equipped with a backup power source. In the basic version the DC voltage source is a battery fitted as standard in the vehicle, but it can be a source dedicated exclusively to the needs of the integrated system. The backup source is placed in the immediate vicinity of the central processing unit in order to minimize the risk of cutting it off from its source of supply. It is recommended the backup source is continuously or periodically recharged from the main power source.

This invention proposes the new system of emergency door opening, which consists of two specialized systems: the first is intended to open the locks or the door bolts and the second system is activated following the actuation of the first one and pushes out the unlocked door. Operation of both systems, as well as operation of the system cutting the seat belts is based on pyrotechnic, pneumatic or electric actuators. Whenever the actuator will be mentioned hereinafter, this should be understood as any of these types of actuators.

The function of the first system of the door lock or bolts opening carries at least one first low-power actuator positioned inside the door or on the door inside the vehicle. It is mechanically connected to the lock in such a way that it presses or pulls the door handle or the tension member, or the lever in the closing or locking mechanism. After starting the electronic system controlling the emergency opening of the vehicle door it provides at first a signal to each of the first actuators, which after activation remains in the extended position. The actuator cannot go back (contract), since it must hold the lock and/or the bolts in open position. To do this, the first actuators are equipped with securing means to prevent contracting of their operating elements.

It should be emphasized that opening both locks and bolts of the door is important to rescue the victims of the accident, because the locks can also be blocked by the bolts locking the door, mounted as standard in cars.

Only after opening the locks and/or the door bolts by the first actuators, another signal is transmitted from the central processing unit to the second more powerful actuators, deflecting the door. The second actuators after activation may withdraw or what is recommended to remain in the extended position, depending on the specific structural conditions of the opened element. Stopping the second actuators in an extended position is also carried out by the retaining elements.

In particular a supporting compact electric actuator, containing a small electric motor or electromagnet can be used for emergency opening of the lock bolts. Such an actuator is mounted aside or inside the lock case, as are the actuators mounted usually in automotive vehicles in the central lock. Upon occurrence of an emergency, the electronic system transmits an electrical signal to the actuator and at first the door lock or a central lock is opened, if it has been closed after the start of driving. In an embodiment of the invention, wherein for opening of the door lock an electric actuator is used, already applied in vehicles and mounted inside the lock casing and serving for closing and opening the central lock, it is proposed to use it by changing the construction of the lock casing or optionally using an additional electric actuator, placed in the door lock casing. After generating a signal to open the door locks the actuator is ignited which opens the main bolts of the lock and remains in open position, preventing the return of the bolts into the closed position. At the same time or with a delay after opening the main lock bolts or the door bolts, the external and internal handles of the doors or internal and external door bolts are shifted or ejected into open position and locked in this position. This function of the handle, especially the external handle, is a warning to other persons who want to save the accident victims not to approach the door of the vehicle, which will be automatically opened after a while.

The use of the actuator opening the lock and door bolts prevents breaking the lock or the bolt, so that the locking of the door is not destroyed. However, when the lock or locking bolts can not be opened, for example due to deformation, the second actuators with a higher output from the second system deflecting the door will tear the blocking. If, however, opening the door lock is successful and the door itself will open, the integrated system interrupts the procedure and does not run another system, i.e. the system deflecting the door. This is to minimize the risks posed by the need for actuators with increased power necessary to effectively push out the door.

The actuator in the system deflecting the door can be mounted directly to the aperture in the car body or can be closed in a special housing attached to the aperture in the body.

For mounting, the door opening actuators can be inserted from outside into the body, e.g. a door pillar or can be inserted from the inside of the vehicle. Then they must be screwed to the body structural member, and from the interior of the vehicle protected by suitable plugs. The actuators should be placed below the bottom line of windows and in the door sills.

The assembly method of the door opening actuator is that the base of the actuator body, i.e., the part comprising the connecting wires, is attached to the vehicle body member that is located on the inner side with use of screws, riveting, gluing or welding. Usually the automotive outer shell is made of thin metal sheet of thickness being typically between 0.6 and 1.0 mm which is not suitable for attaching the pyrotechnic devices. On the other hand, the internal structures, for example the profiles of the door pillars of the vehicle with the seat belt fasteners are made of strong and thick plates, e.g. of enhanced boron steel with a thickness of approximately 3.0 mm, which ensure proper body strength. However, if the thickness or impact strength of the structural body member is not sufficient, in the embodiment of the method for assembling the actuator it is screwed to additional reinforcing member such as a flat piece of steel fixed to the body element. This operation enables to spread the impact of the actuator after the outbreak of the pyrotechnic charge over a larger surface of the body structural component, and thus not deform the structure being the support for the actuator.

The actuator includes an element blocking it after activation in the extended position in order to secure the deflected door before returning to its primary position, that is before being latched again.

The whole actuator is hidden between the inner plate (stronger, to which it is attached) and an outer plate (thinner). In the outer plate an aperture is cut which is required for the movable element of the actuator to expand for pushing the door. This aperture can be closed or sealed with a plastic plug, preferably with a warning indicating the pyrotechnic actuator is located behind the plug. Attaching the plug should not constitute a mechanical barrier to the actuator after its activation.

The second step of the process of the actuator assembly consists in that a cap is placed on its movable (extendable) part, with a diameter smaller than or equal to the diameter of the aperture in the outer side of the door pillar or the body shell. Placing the cap on the extendable part of the actuator prevents it from point action in order to avoid deformation or destruction of pushed element. In turn, at the inside of the door opposite to the aperture in the external shell (with door closed) a reinforcing door cap is arranged to receive the force of impact of the cap located on the expanding element of the actuator. Depending on details of the door design the door cap can be flat or skew. In the latter case, the wedge shape compensates a slant separation between the door element and the cap on the actuator. Aslant impact of the actuator could cause slipping off the door edge and jamming rather than opening the door.

The door cap can be used primarily in the already produced vehicles. Alternatively, in particular for newly manufactured vehicles, shaping the door inner side may be applied instead of the door cap. This embossing provides additional reinforcement for the door. Further details related to the door cap also apply to the embossing in the door metal sheet.

In order to prevent the actuator from slipping of the door cap it may be formed with a concavity on the side of the actuator. The door cap further reduces punctuality of the actuator impact and prevents from unwanted deformation of the pushed element. In addition, the door cap fills the space between the door and outer surface of the door pillars ranging in various vehicles from 20 mm to 50 mm. In the absence of the door cap this free space causes adverse effect of reducing the time of the actuator acting to open the vehicle door, thereby reducing the efficiency of deflecting the jammed door. The use of the cap extends the time of the door pushing by the actuator and enhances effectiveness of the invention.

The cap on the movable part of the actuator may also act as a plug in the aperture made in the body shell. It is recommended, however, that the actuator is all hidden between the body inner and outer sheets, the cap does not protrude above the surface of the aperture, and the aperture is additionally protected and sealed with a label.

A method of emergency releasing of the persons trapped in the vehicle consists in that the system continuously collects data from all the sensors connected to it, beginning from identification of the occupied passengers' seats in the vehicle and identification of locations occupied by the child seats. In the event of a road incident the system determines the current state of the vehicle, initiates opening of the locks and bolts of the door, then initiates deflection or pushing of the door with partial or total destruction, then initiates cutting off the seat belts at the seats occupied by the passengers except of safety belts at the child seats. Simultaneously or at the next step the system sets the coordinates of the vehicle, draws up a report on the state of the vehicle and sends the message to the recipients specified in the system, in particular the emergency services and/or a dispatcher. Additionally, the system activates emergency lighting inside and outside of the vehicle, and other visual and audible warning signals.

In order to ensure safety of bystanders who are witnesses of the accident, and want to rescue the occupants of the vehicle, a warning light source, e.g. yellow flashing LED and notices warning of automatic door opening after the accident are mounted on the outer surface of the door. The warning signs can be highlighted or displayed in a warning color. Alternatively or additionally a voice warning is issued of the imminent opening of the doors or an audible warning signal, for example of frequency increasing until the activation of the actuators.

Figure 2:
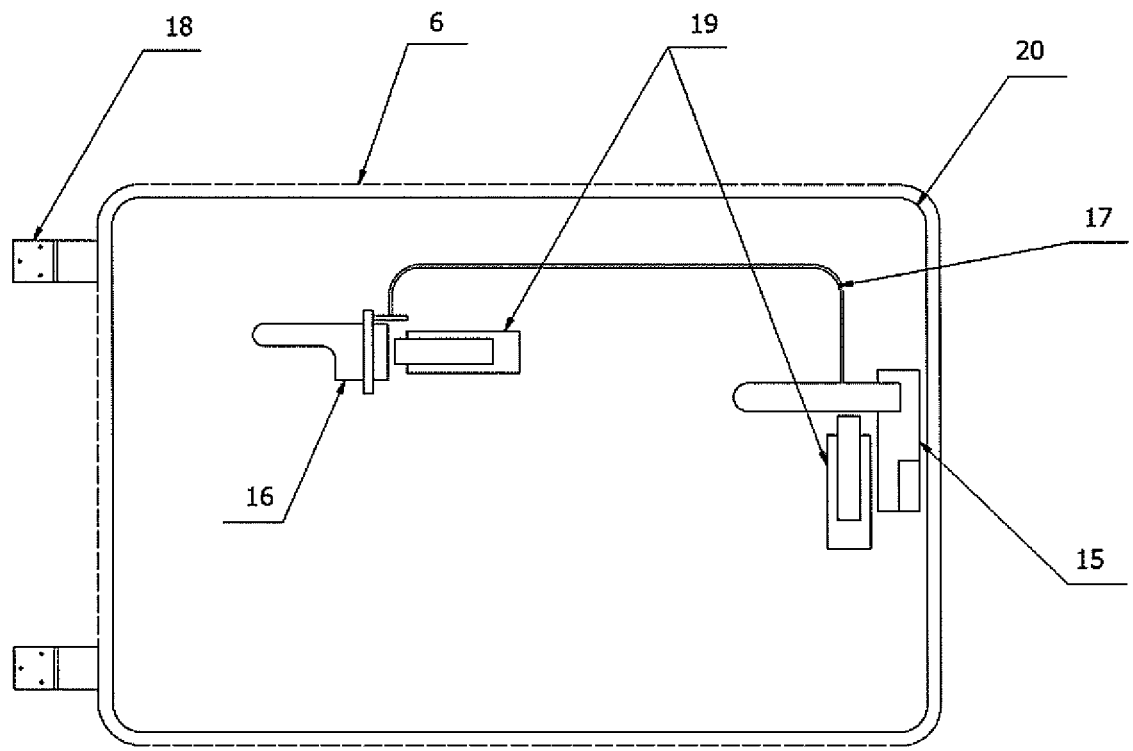
Figure 3:
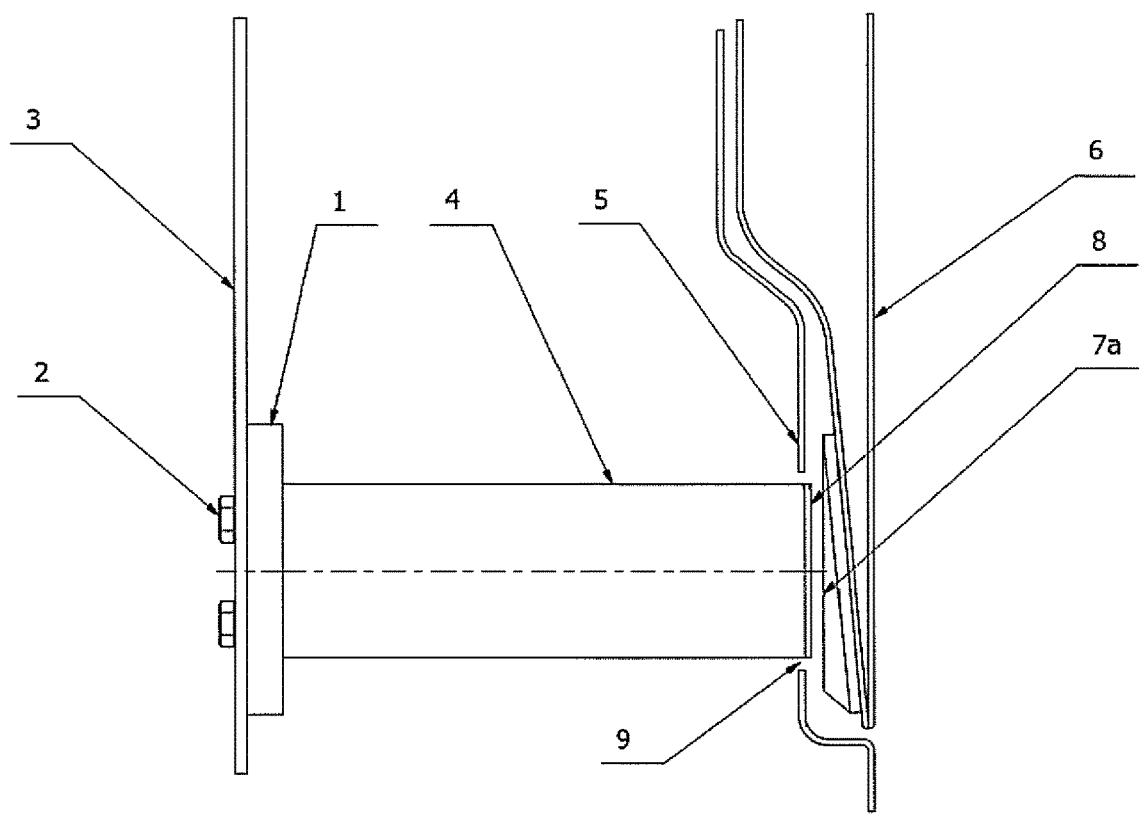
Figure 4:
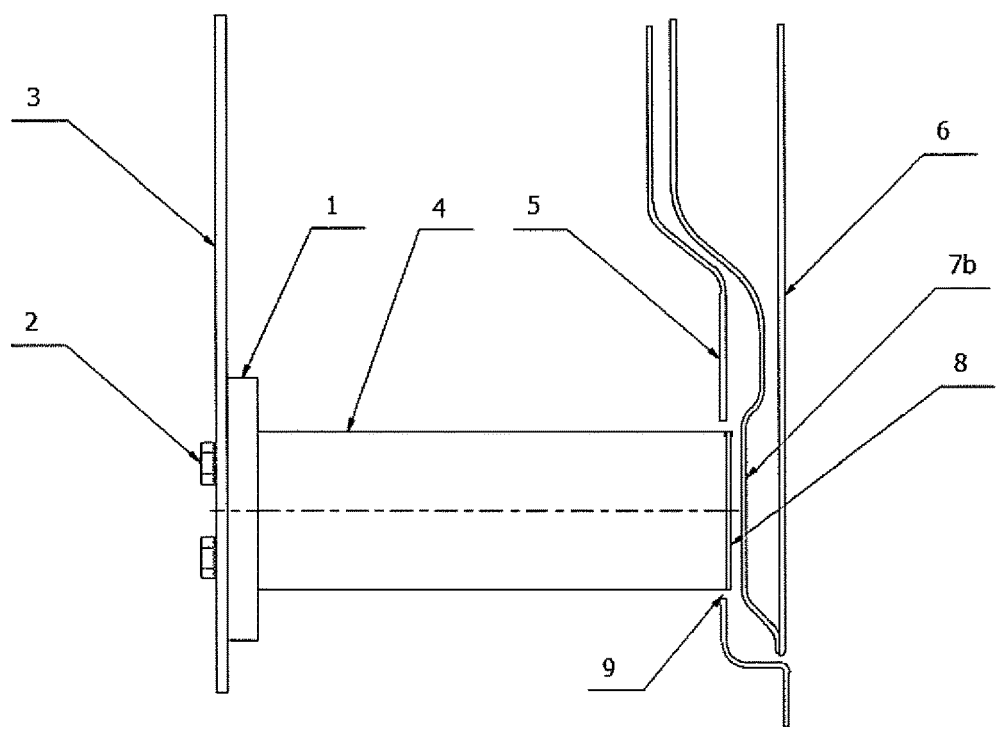
Figure 5:
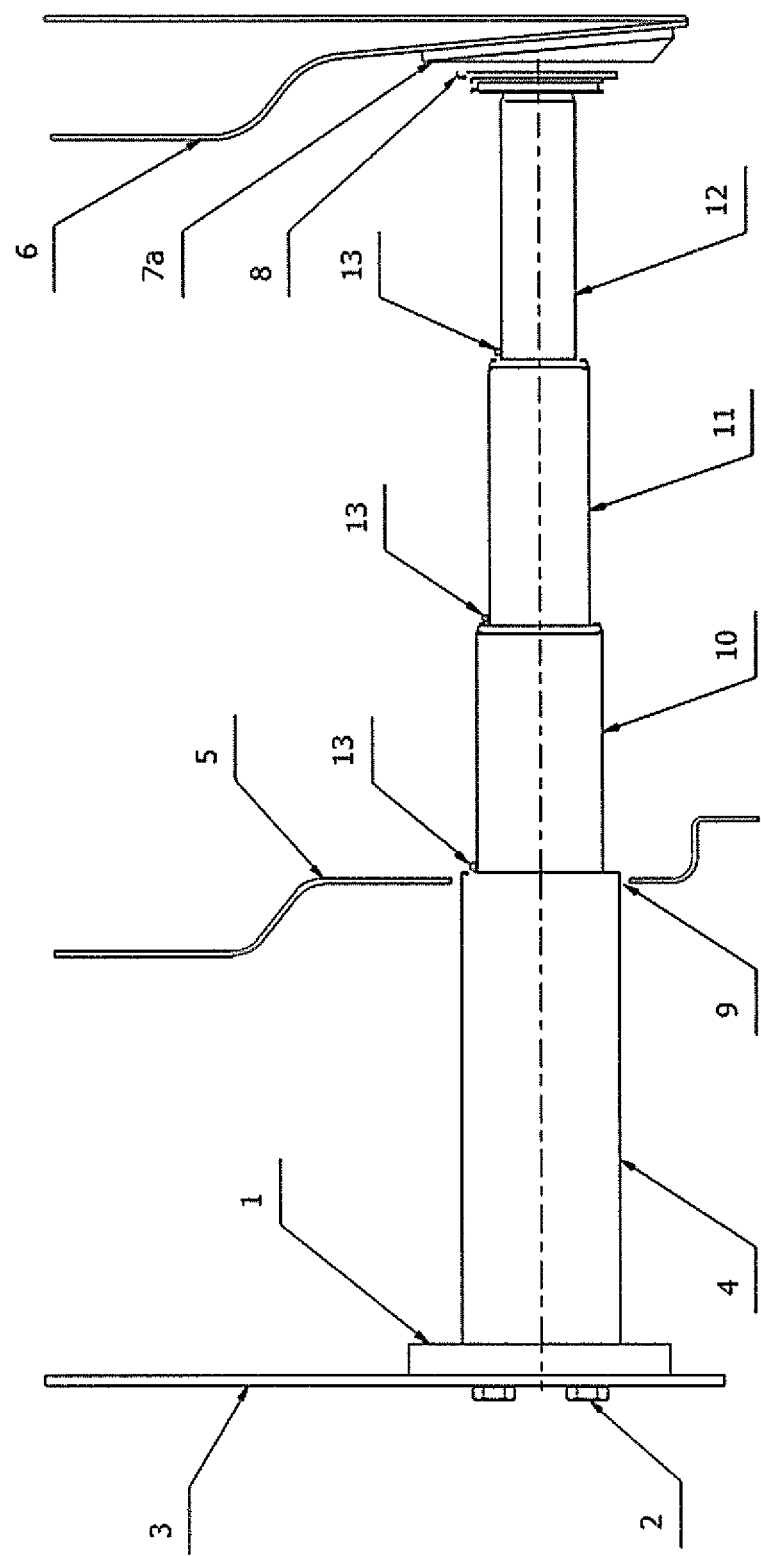
Figure 6:
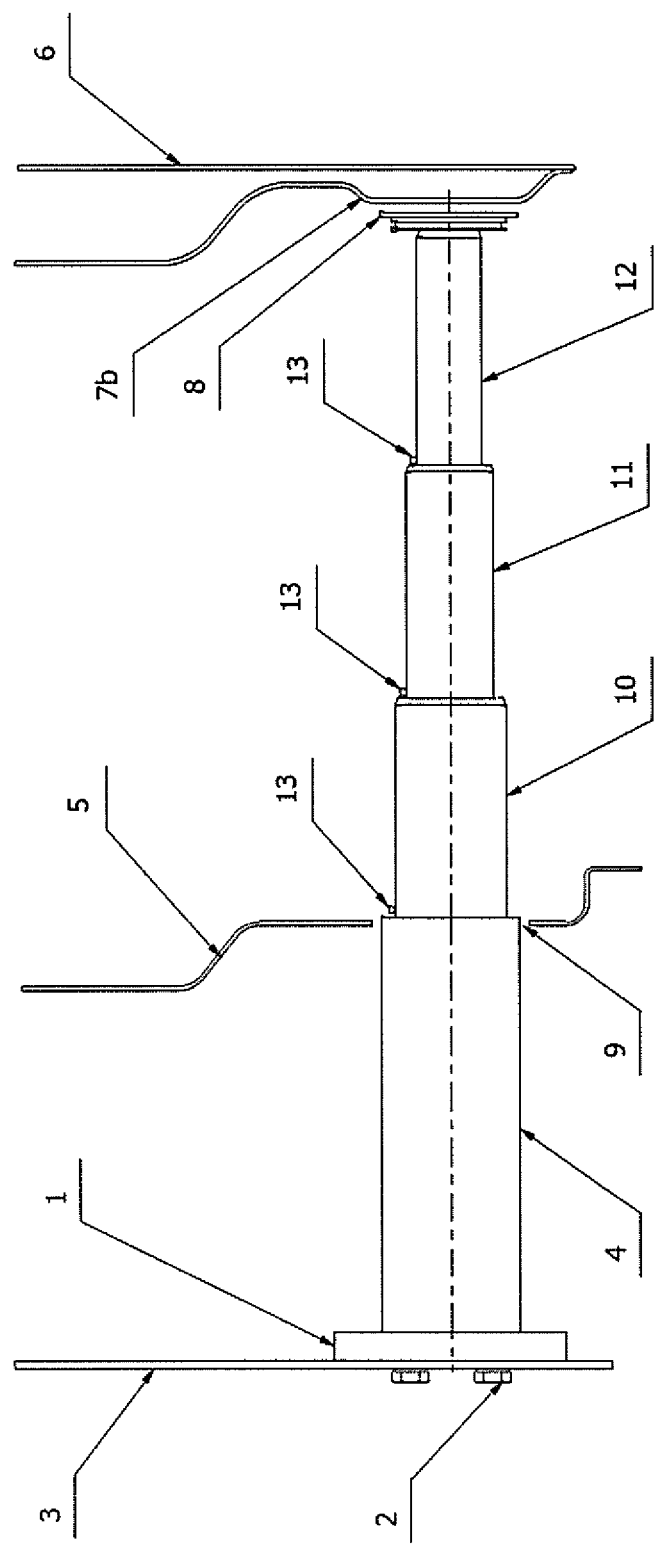
Figure 7:
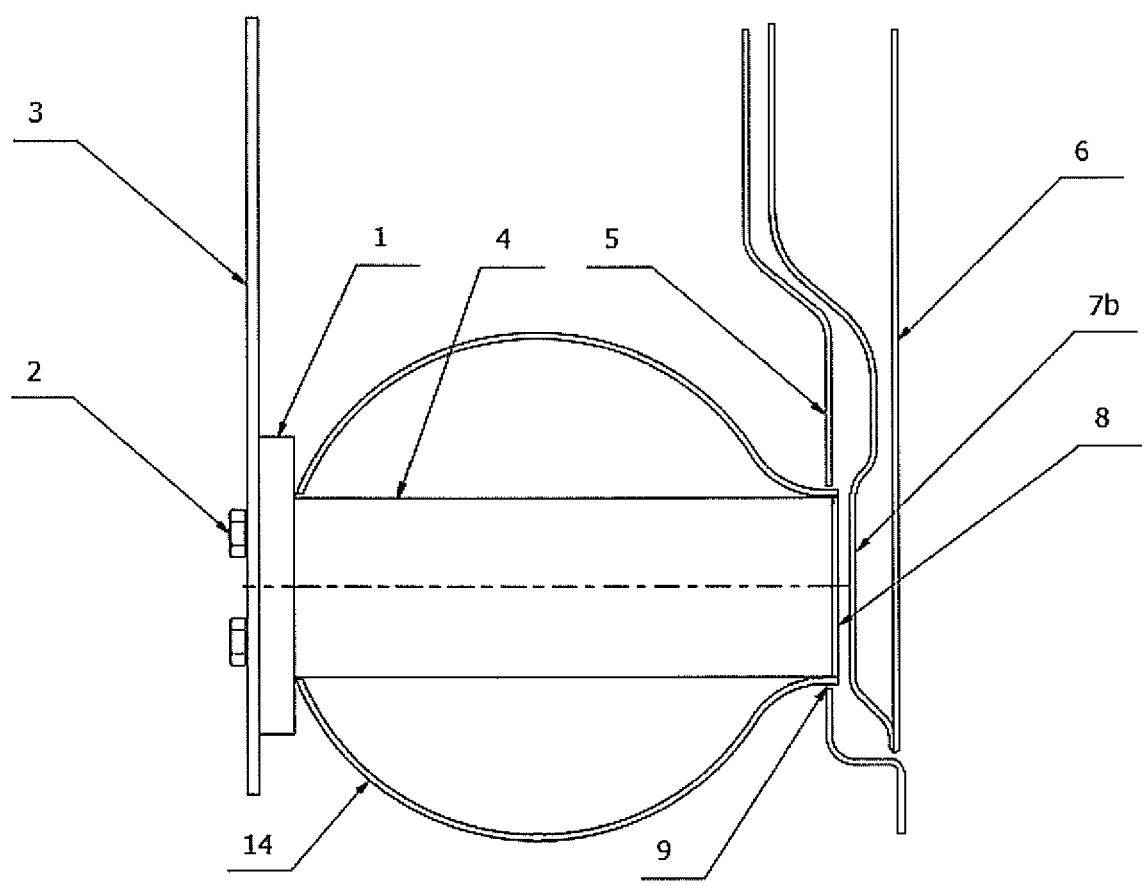

The embodiments of the invention are shown schematically in the drawing, wherein:

FIG. 1 shows a block diagram of the key elements of the integrated system,

FIG. 2 shows a system of actuators opening the locks and the door bolts, mounted inside the car door, FIG. 3 shows the actuator deflecting the door in a first embodiment in a state before activation, with a door cap, FIG. 4 shows the actuator deflecting the door in a second embodiment in a state before activation, with an embossing of the door, FIG. 5 shows the actuator deflecting the door in the first embodiment in a state after activation, with the door cap and with visible snap locking means, FIG. 6 shows the actuator deflecting the door in the second embodiment in a state after activation with the embossing of the door and with visible snap locking means, FIG. 7 shows an actuator deflecting the door in the second embodiment in a state before activation, with the embossing of the door, and with protective spring element.

The integrated system for automatic release of persons trapped in vehicles (Passengers Automatic Rescue Integrated System—PARIS) shown schematically in FIG. 1 includes the central processing unit (CPU) to which the sensors D1, D2, . . . Dn and the input-output socket S for connecting the service computer are connected. The central processing unit CPU if necessary forwards appropriate signals to: the system of automatic cutting of the seat belts (Safety Belt Cutter—SBC), the system of automatic opening of the locks and the door bolts and blocking them in open position (Lock Opener and Blocker—LOB), the system of automatic deflecting the doors and locking them in open position (Door Opener and Blocker—DOB), and to complementary systems: the system of wireless communication (Wireless Communication System—WCS), the system of emergency lighting inside the vehicle (Interior Lighting System—ILS), the system of radio positioning (Radio Positioning System—RPS). Optionally, the system PARIS can include e.g. the system of emergency lighting the exterior of the vehicle (Exterior Lighting System—ELS), the system warning of an accident (Accident Warning System—AWS), the system warning of pyrotechnic devices (Explosives Warning System—EWS) and other. In order to simplify the drawing the power supply, buttons and switches, and other less essential elements are not shown in FIG. 1.

The signals can be transmitted by wire or wirelessly, although to protect against accidental or intentional radio interference from unauthorized persons/devices, internal communication by wire between all elements of the integrated system PARIS is recommended.

In the described here embodiment of the integrated system the known system of cutting of seat belts SBC is used. However, as shown schematically in FIG. 2 the system opening the locks and the door bolts LOB contains novel solutions: separate for locks and bolts first actuators 19 open them when activated by the CPU, mutually supporting their action through the tension member 17. The activation of at least one first actuator 19 leads to deflection of the interior handle 16 and opening the lock or the door bolt 15 between the door 6 and the door opening 20. Opening of locks and door bolts allows the door deflection on hinges 18. The use in the system LOB of two first actuators reduces the risk of damage to the locks opening system as a result of the accident. Effective opening of the locks and bolts connected by the tension member should be possible with activation of only one actuator.

The second actuator deflecting the door in the system of door opening and blocking DOB is fixed with screws 2 to the structural member 3 of the body, e.g. the door pillar located at the inner side of the vehicle. In this case the screws 2 are screwed directly to the actuator body 4. The fastening of the actuator may be reinforced using the padding 1 that stiffens the structural element 3 of the car body. For example, a metal flat bar having a thickness of 3 mm is used as a padding, which should be integrated with the structural element 3 by screwing, riveting, gluing, or welding. The other end of the actuator is located in the axis of the aperture 9 formed in the outer surface of the door pillar, or the sheet body 5, to allow its free sliding out from the aperture 9 after activation of the actuator and then pushing the metal sheet of the door 6.

The end of the movable element i.e. the inner sleeve 12 of the actuator is provided with a cap 8 matching the shape of the door cap 7a placed permanently on the door 6 and facing the aforementioned aperture 9, or embossing 7b at the inner surface of the door 6. According to the door structure the door cap 7a is wedge-shaped as in FIGS. 3 and 5, or flat. It is recommended that the embossing 7b in the door sheet, used as an alternative to the door cap 7a, is flat, as in FIGS. 4, 6 and 7.

All first and second actuators are provided with a ratchet retaining element in the form of a clip or pin 13 projecting from the socket after the sleeve 10, 11, 12 is projected, and blocking its return to the original position. Alternatively, the blocking retaining element may have a form of a flexible strap 14 of metal or plastic attached to the cap 8 at the end of the internal sleeve 12 of the actuator and adjacent to its body 4, or—for a strip longer than the actuator in a state before activation—it may be bent in an arc as in FIG. 7. The free end of the elastic strap has a hitch. When the actuator expands, the strap straightens due to its elasticity and then the hitch rests on the edge between the two sleeves, which prevents the actuator sleeve from returning.

In yet another embodiment, not shown on the drawing, the retaining element may be a mechanism built inside the extendable sleeves comprising the detents pressed by a spring. The ends of the detents slip into the holes or notches made in adjacent sockets.

In the test embodiment the actuators deflecting the car door were mounted in a car ford mondeo. The apertures were made in the outer shell of the door pillars having a diameter enabling insertion of the actuators into the interior of the pillars. The actuators were fixed with screws to the internal structural elements of the pillars. The weaker pillar was reinforced with additional pad in the form of a steel strip having a thickness of 3 mm. After activation the actuators exerted a force of up to 5000 N and effectively deflected the jammed door. The inner, thicker plates of the pillars bent at the attachment point of the actuator of only about 3-4 mm. It is estimated that the pillars structure can withstand several times larger force, of the order of 15-20 kN, which is a big excess of force needed to open the jammed door of the motor vehicle. In addition it should be mentioned that according to the results of measurements performed in the laboratories of the Volkswagen Group, to open the jammed door of the driver in VW polo after a collision with VW phaeton a force of about 500 N is enough. The test results show that the proposed solution will be effective also in heavier structures of vehicles.

The invention claimed is:

1. An integrated system (PARIS) for releasing in emergency the persons trapped in a vehicle, said integrated system being mounted in said vehicle provided with sensors, locks, door having an interior door handle and fitting a door opening and suspended on hinges, door bolts, and seat belts, characterized in that the integrated system comprises a central processing unit (CPU), an input of which is connected to sensors (D1, D2, . . . Dn), and an output of which is connected to at least three executive systems activated in a sequence: a system of automatic opening of the locks and the door bolts and blocking them in open position (LOB), comprising at least one first actuator (19) located inside the door (6) to deflect an interior door handle (16) and open the locks and/or the bolts (15) coupled to the interior door handle (16) through a tension member (17), a system of automatic deflecting the door and locking it in open position (DOB), comprising at least one second actuator with a housing (4) located outside the door (6) to deflect the door (6) on the hinges (18) in the door opening (20), and a system of automatic cutting of the seat belts (SBC), comprising at least one actuator for cutting a safety belt, except of a belt securing a child seat.

2. The integrated system according to claim 1, characterized in that it comprises at least one of the following systems: a system of wireless communication (WCS), a system of emergency lighting inside the vehicle (ILS), a system of radio positioning (RPS), a system of emergency lighting outside the vehicle (ELS), a system warning of an accident (AWS), and a system warning of pyrotechnic devices (EWS).

3. The integrated system according to claim 1, characterized in that the sensors (D1, D2, . . . Dn) are selected from: impact sensors, acceleration sensors, sensors of airbags activation, sensors of belts fastening and tension, sensors of speed, displacement, tilt, pressure, temperature, air pressure, including tire pressure, cameras, water detectors, satellite positioning receivers.

4. The integrated system according to claim 1, characterized in that the central processing unit (CPU) is connected to manual buttons and/or control switches placed inside the vehicle to activate preset functions of the integrated system, and in particular to release the belt securing the child seat, and is connected to an input/output socket (S) for connecting a service computer.

5. The integrated system according to claim 1, characterized in that it comprises a main power source, preferably a DC source and a backup DC power source, preferably fed continuously or intermittently from a main power source.

6. The integrated system according to claim 1, characterized in that two first actuators (19) in the system of automatic opening of the locks and the door bolts and blocking them in open position (LOB) are arranged inside the door, one at the door handle (16) to deflect it directly after activation, and one at the lock and/or the bolt (15) blocking the door (6) to open it directly after activation.

7. The integrated system according to claim 1, characterized in that the at least one second actuator with a body (4) in the system of automatic deflecting the door and locking it in open position (DOB) is provided with a cap over the end of an inner sleeve (12) positioned opposite a door cap (7a) or an extrusion (7b) of the door sheet (6), and with a retaining element (13, 14) blocking the sleeves (10, 11, 12) after activation of the actuator in the position extended from the body (4) of second actuator, and in that the body (4) of second actuator is provided with a stiffening pad (1).

8. A method of releasing in emergency the persons trapped in a vehicle with use of an integrated system (PARIS), the integrated system being mounted in said vehicle provided with sensors generating signals transmitted to a central processing unit, locks, a door having the interior door handle and fitting a door opening and suspended on hinges, door bolts, and seat belts, characterized in that a central processing unit (CPU) of the integrated system (PARIS) after receiving from the sensors (D1, D2, . . . Dn) the signals indicating an emergency and after the vehicle is immobilized, sends to a system of automatic opening of the locks and the door bolts and blocking them in open position (LOB) a signal activating at least one first actuator (19) located inside the door (6) to deflect an interior handle (16) and open the locks and/or the bolts (15) coupled to the interior handle (16) through a tension member (17), then sends to a system of automatic deflecting the door and locking it in open position (DOB) a signal activating at least one second actuator with a housing (4) located outside the door (6) to deflect the door (6) on the hinges (18) in the door opening (20), and then sends to a system of automatic cutting of the seat belts (SBC) a signal activating at least one actuator for cutting a safety belt, except of an actuator positioned at the belt securing a child seat.

9. The method according to claim 8, characterized in that the central processing unit (CPU) determines spatial coordinates of the vehicle, prepares a message about the current state of the vehicle and sends it through a system of wireless communication (WCS) to receivers listed in the system, and preferably activates a system of emergency lighting inside the vehicle (ILS), a system of radio positioning (RPS), a system of emergency lighting outside the vehicle (ELS), a system warning of an accident (AWS), and a system warning of pyrotechnic devices (EWS).

10. A method of mounting an actuator opening a door of a vehicle, said vehicle having a body with at least one door pillar, for implementation of an integrated system (PARIS) for performing a method of releasing in emergency the persons trapped in a vehicle, characterized in that proximal end of said actuator deflecting the door is fixed by rivets or screws (2) to a most stiff element (3) of the vehicle body, located on inner side of the vehicle, wherein rivets or screws (2) are fastened to a body (4) of said actuator directly or through a stiffening pad (1) integrated with said stiff element (3) by screwing, gluing or welding, and wherein distal end of said actuator is aligned with an axis of an aperture (9) formed in the vehicle body and facing said stiff element (3), namely a door pillar, a vehicle shell or sheet metal body (5).

11. The method according to claim 10, characterized in that distal end of inner sleeve (12) of the actuator is provided with a cap (8) matching the shape of a wedge or a flat door cap (7a) which is placed permanently on the door (6) opposite an aperture (9) cut out in the door pillar, a vehicle shell or sheet metal body (5), or said cap (8) matching the shape of an extrusion (7b) on an inner surface facing the interior of the vehicle of the door (6) opposite the said aperture (9).

12. The method according to claim 11, characterized in that a contact surface of contact between the cap (8) provided on the actuator with a door cap (7a) placed permanently on the door (6) opposite the aperture (9) or extrusion (7b) on the inner surface facing the interior of the vehicle of the door (6) opposite the said aperture (9) is convex and the corresponding contact surface of contact between the door cap (7a) or the extrusion (7b) is concave.

* * * * *